Figure 1:
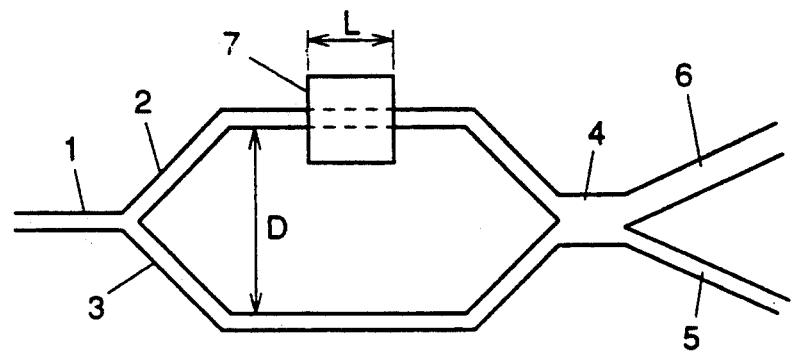

United States Patent [19]

Diemeer

[11] Patent Number: 5,293,436
[45] Date of Patent: Mar. 8, 1994

[54] INTEGRATED OPTICAL DEVICE ADJUSTABLE AS A POLARIZATION SPLITTER BY MEANS OF A MACH-ZEHNDER INTERFEROMETER

[75] Inventor: Martinus B. J. Diemeer, Zoetermeer, Netherlands

[73] Assignee: Koninklijke PTT Nederland N.V., Groningen, Netherlands

[21] Appl. No.: 963,842

[22] Filed: Oct. 20, 1992

[30] Foreign Application Priority Data

Nov. 1, 1991 [NL] Netherlands .................. 9101835

[51] Int. Cl.$^5$ .............................. G02B 6/10
[52] U.S. Cl. ...................... 385/11; 385/14; 385/45; 385/132
[58] Field of Search ............. 385/11, 14, 28, 45, 385/129, 130, 131, 132, 39

[56] References Cited

U.S. PATENT DOCUMENTS

| | | | |
|---|---|---|---|
| 4,772,083 | 9/1988 | Ahmed ..................... | 385/37 |
| 5,007,696 | 4/1991 | Thackara et al. ........... | 385/132 |
| 5,039,186 | 8/1991 | Man et al. ................ | 385/122 |
| 5,056,883 | 10/1991 | Diemeer et al. ........... | 385/8 |
| 5,064,264 | 11/1991 | Ducharme et al. .......... | 385/130 |
| 5,093,883 | 3/1992 | Yoon et al. ............... | 385/130 |

FOREIGN PATENT DOCUMENTS

0444721A1 9/1991 European Pat. Off. .

OTHER PUBLICATIONS

K. G. Han et al, "Ti:LiNbO$_3$ polarization slitters using an asymmetric branching waveguide", Jul. 15, 1991, pp. 1086-1088, Optics Letters, vol. 16, No. 14.

D. Jungbauer, et al, "Second-order nonlinear optical properties and relaxation characteristics of poled linear epoxy polymers with tolane chromophores", Jun. 15, 1991, pp. 8011-8017, Journal of Applied Physics.

J. W. Wu, "Birefringent and electro-optic effects in poled polymer films: steady-state and transient properties", Jan. 1991, pp. 142-151, Journal of the Optical Society of America.

J. I. Thackara, et al, "Advances in Organic Electro-Optic Devices", Dec. 1987, pp. 19-27, Nonlinear Optical Properties of Polymers Symposium.

*Primary Examiner*—Frank Gonzalez
*Attorney, Agent, or Firm*—Frishauf, Holtz, Goodman & Woodward

[57] ABSTRACT

The invention relates to an integrated optical device which comprises an adjustable Mach-Zehnder interferometer. The waveguide structure of the device is fabricated on the basis of polable unpoled material, the material in one (2) of the branches (2, 3) of the MZ interferometer being poled in a certain area (7). In the case of maximum poling in advance, the degree of poling of the poled material can subsequently be adjusted under conditions of accelerated thermal relaxation. Advantage: the device can first be fabricated, as far as its structure is concerned, using fabrication techniques which are standard for the selected material without additional attention to correct sizing, after which the interferometer section can then be adjusted in a simple manner to the optical pathlength differences required for the specific function of the device. As an example, a passive polarisation splitter is described.

7 Claims, 1 Drawing Sheet

INTEGRATED OPTICAL DEVICE ADJUSTABLE AS A POLARIZATION SPLITTER BY MEANS OF A MACH-ZEHNDER INTERFEROMETER

A. BACKGROUND OF THE INVENTION

1 Field of the invention

The invention is in the field of integrated optics. It relates to an integrated optical device which comprises an adjustable Mach-Zehnder interferometer, and more in particular an integrated optical device adjustable as a polarisation splitter. It furthermore relates to a method for the permanent setting of a device of this type. 2. Prior art Polarisation splitters are known per se, for example from references [1] and [2] (see below under C.). The polarisation splitter known from reference [1] is a passive splitter which is based on an asymmetry in the branching waveguides in the output of the splitter, which asymmetry is achieved by using a polable glassy polymer as optical waveguide material which in the poled state is polarisation-sensitive and in the unpoled state is not, or virtually not, polarisation-sensitive. In this context, the optical waveguide which extends from the input to the output is of unpoled, and the waveguide which branches off under an acute angle, of poled material. Although this splitter has a structure which is simple per se with a short integration length, it is found that the junction between the unpoled and poled material and the positioning of that junction cannot always be effected sufficiently sharply to achieve the desired degree of polarisation separation. Reference [2] describes an active polarisation splitter based on a coupling of a controllable Mach-Zehnder interferometer with an asymmetrically branching output section, the coupling proceeding via a bimodal waveguide section, while the remaining waveguides are monomodal. The waveguides are produced by diffusing Ti into LiNbO$_3$ according to a section such that, at least in the two waveguide branches of the interferometer, the two polarisation modes, i.e. the TE mode and the TM mode, of an optical signal entering the interferometer encounter a different refractive index. By means of two sets of independently controllable electrodes, electrical or thermal, disposed over the two waveguide branches of the interferometer, the optical pathlength for each of the two polarisation modes can be controlled separately. Splitting of the polarisations is achieved if the optical pathlength difference between the two waveguide branches is such that the two signals of the one polarisation distributed over the waveguide branches in the interferometer encounter a phase difference of $2k\pi$, and at the same time the two signals of the other polarisation distributed over the waveguide branches encounter a phase difference of $(2m+1)\pi$ when entering the bimodal waveguide section, where k,m=0, 1, 2, . . . . This known active splitter too has the disadvantage of the presence of locally fitted electrode material. Furthermore, the nature of the electrode structures makes fabrication more laborious and control rather complicated.

Since the polarisation splitting function is, in fact, a passive function, a passive design of the splitter structure known from reference [2] might offer a solution. This would mean, however, that even at the stage of fabrication the optical pathlength differences, necessary for effective operation of the splitting function would have to be achieved for each of the two polarisations in the interferometer by very accurate choice of material with regard to the refractive indices and by dimensioning with very tight tolerances.

B. SUMMARY OF THE INVENTION

The object of invention is to provide a passive integrated optical device having a waveguide structure including an MZ-interferometer section as described above with reference to reference [2], which, by suitable choice of material, can first be fabricated, as far its structure is concerned, using the usual fabrication techniques which are standard for that material without additional attention to correct dimensioning, and of which the interferometer section can then be adjusted in a simple manner to the optical pathlength differences required for the specific function of the device According to the invention, an integrated optical device comprising an incoming waveguiding input section, a Mach-Zehnder interferometer connected thereto having two monomodal waveguide branches which diverge from each other to beyond their mutual interaction spacing and which subsequently merge again, and a waveguiding output section connected thereto, has, for this purpose according to the invention, the characteristic that, in one of the two waveguide branches outside said interaction spacing a region of polable poled material is incorporated, at least locally. The invention is based on the following insight. Polable poled materials, like the polable glassy polymer known from reference [1], may be in two states, namely an unpoled and a poled state. The unpoled state is polarisation-insensitive; the poled state, however, is polarisation-sensitive. This polarisation-sensitivity is the consequence of the fact that, with regard to the refractive index of unpoled polymer, as a consequence of poling, a refractive index change occurs which is always twice as large and, furthermore, of opposite sign in a direction parallel to the poling direction, compared to that in a direction perpendicular to the poling direction, this being independent of the poling parameters. This implies that an optical signal which propagates through an area of polymer poled in this way, for example in a direction perpendicular to the poling direction, and which comprises both a TE component and a TM component, these polarisation components will encounter a difference in optical pathlength. The absolute magnitude of the refractive index change as a consequence of poling is proportional to the measure of poling, or degree of poling, of the polymer. As high as possible a degree of poling is achieved if the polymer is poled with the highest possible poling voltage. It is known from reference [4] (see, in particular, section IV. C. "Decay of poling-induced alignment" and FIG. 4), that this degree of poling shows no visible change at room temperature over long periods. At an increased temperature, albeit still below the glass transition temperature, the degree of poling decreases, however, according to a typical relaxation curve. This process of decrease in poling decreasing stops upon cooling to room temperature again. The present invention makes use of this phenomenon by incorporating a material of this type in one of the branches of a Mach-Zehnder interferometer, as a consequence of which, after fabrication of the structure of the device in which said interferometer is applied, said device can then be adjusted, by making use of the thermal relaxation phenomenon mentioned above, to the desired optical pathlength difference or phase difference between the two branches of said interferometer for each of the two optical polarisations. It is therefore also an object of the present invention to provide a method for adjusting an integrated optical device comprising a passive Mach-Zehnder interferometer which can be adjusted in this way.

C. REFERENCES

[1] EP-A-0444721;
[2] K.G. Han, et al.: "Ti:LiNbO$_3$ polarization splitters using an asymmetric branching waveguide", OPTICS LETTERS, Vol. 16, No. 14, Jul. 15, 1991, pp. 1086–1088;
[3] J.W. Wu: "Birefringent and electro-optic effects in poled polymer films: steady-state and transient properties", J. Opt. Soc. Am. B/Vol. 8, No. 1/January 1991, pp. 142–152;
[4] D. Jungbauer, et al.: "Second-order nonlinear optical properties and relaxation characteristics of poled linear epoxy polymers with tolane chromophores", J. Appl. Phys. 69(12), 15 June 1991, pp. 8011–8017.

D. BRIEF DESCRIPTION OF THE DRAWING

Figure 2:
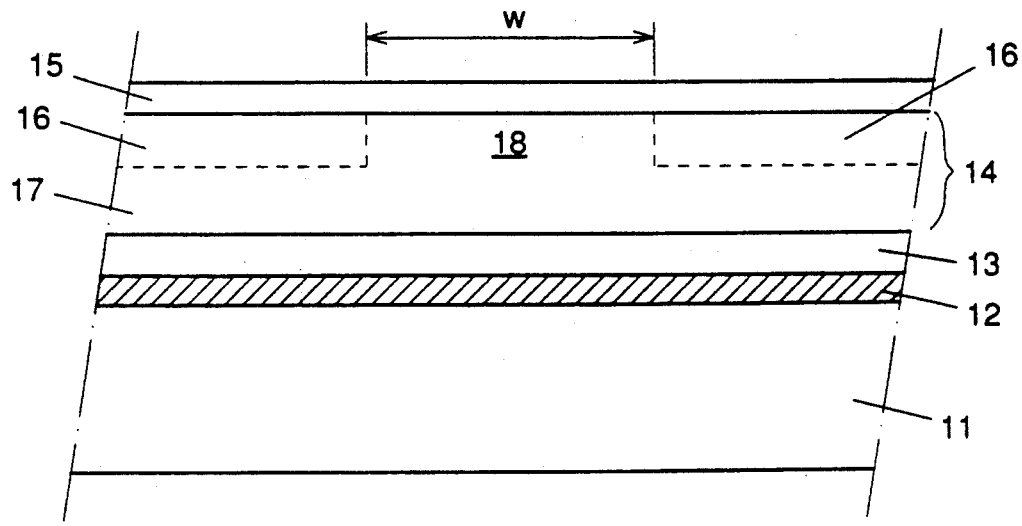
Figure 3:
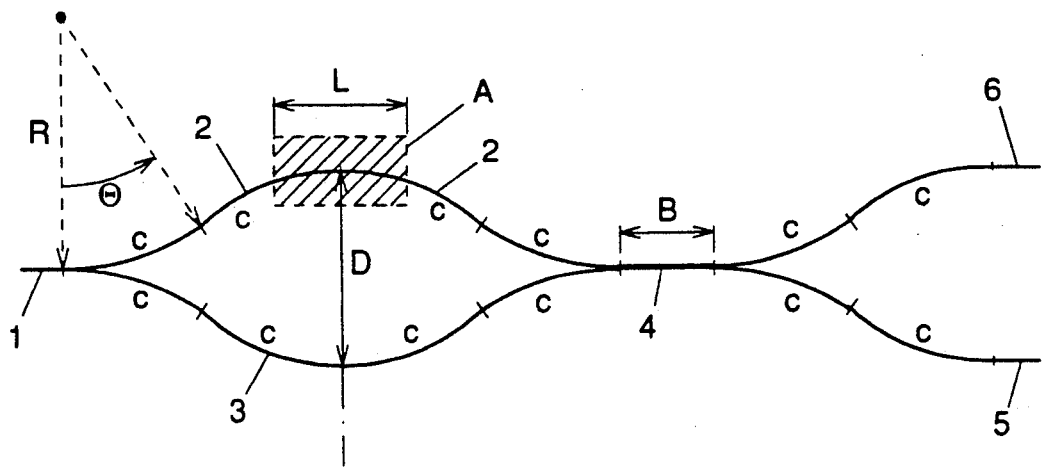

The invention will be explained hereinafter by reference to a drawing which comprises the following figures:

FIG. 1 structure diagram of an adjustable passive polarisation splitter according to the invention;

FIG. 2 cross section known per se of a waveguide used in the polarisation splitter according to FIG. 1;

FIG. 3 waveguide pattern for an adjustable polarisation splitter.

E. DESCRIPTION OF AN EXEMPLARY EMBODIMENT

It is known, for example from reference [1], that a polable glassy polymer can be in two states, namely an unpoled and a poled state. The unpoled state is polarisation-insensitive. The poled state, however, is polarisation-sensitive. It is known, for example from reference [3](see, in particular, equations (2.10) and (2.11) and the subsequent 5 lines of text), that, with regard to the refractive index of unpoled polymer, as a consequence poling, a refractive index change occurs which is always twice as large and, furthermore, of opposite sign in a direction parallel to the poling direction, compared to that in a direction perpendicular to the poling direction, this being independent of the poling parameters. This implies that an optical signal which propagates through an area of polymer poled in this way, for example in a direction perpendicular to the poling direction, and which comprises both a TE component and a TM component, these polarisation components will encounter a difference in optical pathlength. The absolute magnitude of the refractive index change as a consequence of poling is proportional to the extent of poling, or degree of poling, of the polymer. As high as possible a degree of poling is achieved if the polymer is poled with the highest possible poling voltage. It is known from reference [4](see, in particular, section IV. C. "Decay of poling-induced alignment" and FIG. 4), that this degree of poling shows no visible change at room temperature over long periods. At an increased temperature, albeit still below the glass transition temperature, the degree of poling decreases, however, according to a typical relaxation curve. This process of the degree of poling decreasing stops upon cooling to room temperature again. The present invention makes use of this phenomenon by incorporating a material of this type in one of the branches of a Mach-Zehnder interferometer in order to adjust the device to the desired optical pathlength difference or phase difference between the two branches of said interferometer for each of the two optical polarisations, after fabrication of the structure of said device which said interferometer is used, by making use of the abovementioned thermal relaxation phenomenon. The fact that this can be done simultaneously, and that, therefore, no separate adjustment facilities are required for the two polarisations, is based on the linear relationship already mentioned above between the two refractive index changes, i.e. equation (2.10) from reference [3]. In polable polymers the anisotropy induced by poling therefore satisfies the following relationships:

$$\Delta n_{TM} = \tfrac{2}{3}\Delta n \text{ and } \Delta n_{TE} = -\tfrac{1}{3}\Delta n \tag{1}$$

respectively for the increase of the refractive index of the TM polarisation t and the decrease of that of the TE polarisation, $\Delta n$ expressing the total birefringence. In a waveguide of poled polymer and of length L, $\Delta n$ can be adjusted by means of thermal relaxation in such a way that, for an optical signal having wavelength $\lambda$, the TM polarisation encounters a phase difference $\Delta\Phi_{TM}=m\pi$, and the TE polarisation encounters a phase difference $\Delta\Phi_{TE}=p\pi$, where $m-p=2k-1$, and $p,k=+1, +2, \ldots$ It follows from (1) that p must then be $=-(2k+1)/3$ and m must be $=(4k+2)/3$. This can be satisfied by m (or p)$=2, 6, 10, \ldots$ and p (or m)$=-1, -3, -5, \ldots$.

This means that, if such a section of waveguide is incorporated in one of the branches of the Mach-Zehnder interferometer of a polarisation splitting structure as already cited above from reference [2], a passive device is thus produced which, by means of a process of thermal relaxation, can subsequently be adjusted with regard to its polarisation splitting function.

In polable polymers, at a wavelength of 1,300 nm, a $\Delta n = 0.06$ can be achieved by poling. If this is the case in one of the waveguide branches over a length L of 5 mm, $\Delta\Phi_{TM}=308\pi$ then applies. By the process of thermal relaxation, $\Delta n$ can be reduced in such a way that, successively, $\Delta\Phi_{TM}=306\pi, 302\pi, 298\pi, \ldots, 2\pi$; at the same time $\Delta\Phi_{TE}=-153\pi, -151\pi, -149\pi, \ldots, -\pi$ then applies. The process is stopped at a suitable value as the adjustment value. In the case of the wavelength and $\Delta n$ chosen for this example it is even possible to adjust for L$=50$ $\mu$m, namely with $\Delta\phi_{TM}=2\pi$ and $\Delta\Phi_{TE}=-\pi$.

FIG. 1 shows a structure diagram of a polarisation splitter according to the invention. An incoming monomodal waveguide 1 branches symmetrically into two monomodal branches 2 and 3 of a Mach-Zehnder interferometer up to a mutual spacing D larger than the interaction spacing, and then merges again symmetrically into a bimodal waveguide 4. This bimodal waveguide 4 then branches asymmetrically into two monomodal waveguides 5 and 6, waveguide 5, for example, having a smaller propagation constant (expressed in the figure by a smaller width) than waveguide 6. Incorporated in the waveguide branch 2 is an adjusting section 7 of length L for the purpose of adjusting the phase differences with which signals which are distributed from the incoming waveguide 1 over the two branches 2 and 3 of the interferometer and which have each of the two polarisations TE and TM arrive in the bimodal waveguide 4.

In an embodiment of the invention, the polarisation splitting device has a waveguide pattern such as that shown in FIG. 1, the Y-shaped branches of the waveguides 1, 2 and 3, of the waveguides 2, 3 and 4, and of the waveguides 4, 5 and 6 being constructed using waveguide sections bent into circular shapes, and all the waveguides having a cross-sectional structure such as the one known from reference [1]. The cross-sectional structure is shown in FIG. 2, the waveguides only being allowed to differ in width w. On a substrate 11 there are, as successive layers, a planar first electrode 12, a first buffer layer 13, a layer 14 of glassy polable polymer and a second buffer layer 15. The layer 14 comprises an area 16 which has been irradiated with UV light, and an area 17 which has not been irradiated. The waveguides having a cross-sectional structure of this type are therefore of the ridge type. The width of the ridge is, for example, 7 $\mu$m for the waveguides 1, 2 and 3, 14 $\mu$m for the waveguide 4, 6 $\mu$m for the waveguide 5, and 8 $\mu$m for the waveguide 6. The length B of the bimodal waveguide 4 can be limited to about 200 $\mu$m. The Y-shaped branches are constructed using waveguide sections shaped as circular arcs, for example with circular arcs c having a radius R=approximately 40.0 mm and an arc angle $\Theta$=approximately 0.02 rad. This is shown diagrammatically in FIG. 3. The waveguides are again numbered 1 to 6 inclusive. Roughly at their centres, indicated by M, the branching waveguides 2 and 3 have the greatest mutual distance D, approximately 0.1 mm. The Y-shaped branches (1, 2 and 3) and (2, 3 and 4) can then directly connect to each other. The total length of the device can then be limited to about three times the minimum required length of a Y-shaped branch. Once the device has been constructed up to this point, the polable polymer of the waveguide 2 is then poled locally in an area A having length L. This is done by means of a second electrode temporarily placed above the ridge 18 of the waveguide 2 for this purpose. Preferably, the maximum permissible poling voltage for the chosen layer thickness of the polymer is used for poling, so that the polymer in that region will attain a maximum degree of poling. The polymer used, at a wavelength of 1,300 nm, has a refractive index of 1.56 in the irradiated form, of 1.59 in the non-irradiated form, and, at the said maximum degree of poling, 1.63 for the TM polarisation and 1.57 for the TE polarisation. As may be clear from the above, the length L is not critical. For the dimensions chosen it may, for example, be 800 $\mu$m so that the poled region of the waveguide 2 extends approximately 400 $\mu$m on both sides of the centre M. After the local poling has been achieved in this way, the device adjusted as follows:

The device is mounted on a hotplate. Linearly polarised light is then launched into the incoming waveguide 1 at an angle of 45°. The polarisation state of the optical signals exiting from the outgoing optical. waveguides 5 and 6 is measured. During this measurement, the device as a whole is heated to a temperature which is close to, but below, the glass transition temperature of the polymer used ($T_g$=approximately 140° C.). The device is cooled at a time when a cleanly polarised signal (TE or TM) is measured at each of the outgoing guides 5 and 6. When a cleanly polarised TE or TM signal is measured at each of the outgoing guides, that can be generally described as the presence of essentially singularly polarised signals at the outgoing guides. Depending on the extent to which the heating is carried out at a temperature closer to or farther from the glass transition temperature $T_g$, the thermal relaxation process proceeds more quickly or more slowly. If L is chosen sufficiently large, there are several adjustment options and it is possible first to observe closely the time-dependent behaviour of the process before it is stopped by cooling. Relaxing the poled polymer in this way, which is in fact a form of artificial ageing, has the additional advantageous effect that a more stable poled state remains.

Other variants are also possible, though technically less easy to implement. Thus, during adjustment, the heating may be locally restricted as far as possible to the area where the polymer has been locally poled. It is also possible for the whole waveguide pattern to consist of guides of poled polymer, the degree of poling of the poled polymer, for the purpose of adjustment, being set locally to a lower level by local heating. In yet another variant, the waveguide pattern may be formed by permanent waveguiding channels in a suitably chosen material, the poled polymer being disposed as a buffer layer in the immediate vicinity of one of the branches of the interferometer, so that it concomitantly determines locally the effective refractive index of the waveguide in question. This variant is not elaborated further.

The wavelength dependence is large for a large phase difference, therefore at large L. This dependence decreases in line with adjustment at a lower degree of poling.

I claim:

1. Passive optical polarisation splitting device comprising
    an input waveguide,
    a Mach-Zehnder interferometer connected to the input waveguide, the interferometer having two monomodal waveguide branches which diverge from each other to beyond their mutual interaction spacing and which subsequently merge again,
    a waveguiding output section connected to the interferometer, the output section including a bimodal waveguiding coupling section which branches asymmetrically into a first and second outgoing monomodal waveguide, and
    a region of glassy polable material incorporated, at least locally, in one of said two monomodal waveguide branches of the Mach-Zehnder interferometer outside said interaction spacing, the glassy polable material in said region having a pre-adjusted degree of poling for providing an optical phase difference between the monomodal waveguide branches of the interferometer, said phase difference being required for polarisation splitting in the waveguide output section.

2. Passive polarisation-splitting device according to claim 1 characterised in that said region of glassy polable material with said pre-adjusted degree of poling forms part of the waveguide in said one of the two waveguide branches.

3. Passive optical polarisation splitting device having a pre-adjustable polarisation splitting function for a predetermined wavelength of light, said device comprising:
    an input waveguide, a Mach-Zehnder interferometer connected to the input waveguide, the interferometer having two monomodal waveguide branches which diverge from each other to beyond their mutual interaction spacing and which subsequently merge again, a waveguiding output section connected to the interferometer, the output section including a bimodal waveguiding coupling section which branches asymmetrically into a first and a second outgoing monomodal waveguide, and a region of glassy polable material incorporated, at least locally, in one of the two waveguide branches of the Mach-Zehnder interferometer outside said interaction spacing, the glassy polable material in said region having a predefined degree of poling, which is adjustable by a process of thermal relaxation for providing an optical phase difference between the two waveguide branches of the interferometer, said phase difference being required for polarisation splitting in the waveguide output section.

4. Passive optical polarisation splitting device according to claim 3 characterised in that said region of said glassy polable material with said pre-defined degree of poling forms part of the waveguide in said one of the two waveguide branches.

5. Method for adjusting an adjustable passive Mach-Zehnder interferometer incorporated in an adjustable passive optical device, which device comprises an input waveguide, a Mach-Zehnder interferometer connected to the input waveguide and having two waveguide branches which diverge from each other to beyond their interaction spacing and which subsequently merge again, and a waveguiding output section connected to the interferometer, a region of glassy polable polymer material being incorporated, at least locally, in one of the two waveguide branches outside said interaction spacing, the glassy polable polymer material having a predefined degree of poling, which method comprises the following steps:

launching a specific input signal into said input waveguide, continuously measuring and/or analyzing an output signal exiting from said output section, decreasing the degree of poling by heating the polable polymer material in said region to a temperature below the glass transition temperature of the polymer material, and fixing a degree of poling during heating of the polable polymer material by cooling of the polable polymer material in said region when a desired output signal is obtained.

6. Method according to claim 5, in which the step of decreasing the poling degree is carried out by heating the polable polymer material in said region to a temperature close to the glass transition temperature of the polymer material.

7. Method according to claim 6, in which said input waveguide is a monomodal incoming waveguide, said output section includes a bimodal waveguiding coupling section which branches asymmetrically into first and second outgoing monomodal waveguides, and in which the steps of launching a specific input signal and of measuring and/or analyzing said output signal are carried out with launching linearly polarised light at an angle of 45° into said monomodal incoming waveguide for the purpose of adjusting the interferometer to a polarisation splitting function of said output section, and the step of fixing the degree of poling is carried out when both in the first and in the second outgoing waveguide an essentially singularly polarised signal is measured.

* * * * *